Patented May 18, 1943

2,319,426

UNITED STATES PATENT OFFICE 2,319,426

PHOTOGRAPHIC COMPOSITION CONTAINING UNSYMMETRICAL DIACYLACETPOLYAMINO - ARYLIDES AND COLOR DEVELOPMENT PROCESSES

Edmund B. Middleton, Woodbridge, and Andrew B. Jennings, New Brunswick, N. J., assignors, by mesne assignments, to E. I. du Pont de Nemours & Company, Wilmington, Del., a corporation of Delaware No Drawing. Application July 13, 1939, Serial No. 284,342

6 Claims. (Cl. 95—6)

This invention relates to color photography. More particularly it relates to color-former compounds which are useful in photographic compositions such as emulsions and developer solutions for producing colored images and to compositions of the type specified. The invention also relates to photographic elements bearing emulsion layers containing novel color-formers which develop to form metallic silver and dyes in admixture with each other.

This invention has for an object to provide novel color-formers which form dyes of improved spectral quality. A further object is to provide novel color-formers which couple readily upon development in colloidal emulsions to form water insoluble immobile dyes in situ with photographic images. A still further object is to provide novel color-formers which do not adversely affect the sensitivity of photographic emulsions, particularly gelatine silver halide emulsions. A still further object is to provide color-formers which form dye images of good quality. Still other objects will appear hereinafter.

The above and other objects are accomplished by the preparation and use of unsymmetrical diacylacet-diamino-arylides in developer solutions and photographic emulsions. These compounds may be represented by the general formula:

RCO—CH$_2$—CO—NH—A—NH—COCH$_2$—R' wherein RCO is an acyl radical of a monocarboxylic acid, R' is an acyl radical of a monocarboxylic acid different from RCO, or a cyano radical, and A is a divalent hydrocarbon radical containing at least two benzene rings. By "divalent hydrocarbon radical" is meant not only the unsubstituted radicals, but also those containing non - water - solubilizing groups, for example, amino, alkyl, alkoxy, halogen and nitro groups and solubilizing groups, e. g. carboxyl or sulfonic acid, which groups may be condensed to form a ring.

The acyl radicals represented by RCO— and R'CO may be derived from various aliphatic, isocyclic and heterocyclic, monobasic, monocarboxylic acids. Among the radicals falling within this class, mention may be made of the following: acetyl, butyryl, decanoyl, benzoyl, 4-chlorobenzoyl, 4-nitrobenzoyl, alpha naphthoyl, furoyl, thienoyl, picolinoyl, nicotinoyl and isonicotinoyl. Furthermore, when RCO is an aroyl group such as benzoyl, it is to be understood that this aroyl nucleus may be further substituted by groups such as alkyl, alkoxy and halogen groups.

In a preferred embodiment of the invention the compounds may be characterized by having the general formula

RCO—CH$_2$—CO—NH—A—NH—COCH$_2$—COR' wherein R'CO— is an acyl radical of a monocarboxylic acid containing a cyclic nuclei and RCO— is an acyl radical of a monocarboxylic acid different from R'CO—.

In a still more preferred embodiment of the invention each of the acyl radicals contains cyclic nuclei which are dissimilar. In this embodiment, one of the cyclic nuclei is preferably heterocyclic.

The radical represented by —NH—A—NH— may be derived from various aromatic diamines of the benzene naphthalene, diphenyl, diphenyl ether, diphenyl thioether, and stilbene series. The aromatic nuclei as above-stated may be substituted by alkyl, halogen, alkoxy, hydroxyl, nitro, carboxyl or sulfonic groups. Two substituents may in some instances be condensed to form additional ring nuclei, e. g. sulfones. In the most practical and important of such cases the structure typified by the radical —NH—A—NH may be represented by the general formula

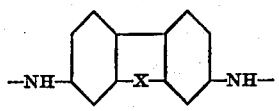

wherein X is —SO$_2$—, —N=N—, —O—, —CO— or —CO—CO—. In these forms of the invention the corresponding diamino compound is diacylacetylated or acylacetylated and cyanoacetylated in the manner set forth below.

The compounds may be prepared by reacting a suitable diamine successively with about one mol each of two different ketonic esters, or a ketonic ester and a cyano acetic ester, that is, esters of the acylacetic acids and cyano acetic acids, containing the radicals RCO—CH$_2$CO— and R'CO—CH$_2$CO—, and CN—CH$_2$CO—. The methyl and ethyl esters, for instance, have considerable utility. It is desirable to have a large amount of a solvent present during the respective amidation reactions, especially to prevent crystallization of the monoacylacet-diamino compound before the addition and/or completion of the second amidation reaction.

The preparation of the unsymmetrical diacylacetdiaminoarylides may be exemplified in the preparation of specific compounds.

Procedure A

Furoylacet-benzoylacet-diaminobenzidine

A solution of 1.1 mols of benzidine in xylene is heated to boiling in a reaction vessel until all water is expelled. A small amount of dry pyridine is added and then 1 mol of benzoylacetic acid ethyl ester is added, the reaction mixture is heated until no more alcohol is evolved. At this point or the instant crystallization commences 1.1 mol of furoylacetic acid ethyl ester is added. The mixture is stirred and an elevated temperature maintained until no more alcohol distills off. The reaction mixture is cooled and the product is filtered off. It may be purified by digestion with solvents e. g. alcohol, ether or pyridine. The product has a melting point of 228° C.

Picolinoylacet-furoylacet-benzidine having a melting point of 239–241° C. may be prepared in a similar manner by substituting a like amount of ethyl-picolinoyl-acetate for the benzoylacetic acid ethyl ester of the above procedure.

Picolinoylacet-benzoylacet-benzidine, M. P. 234° C. (decomposes), may be prepared in a similar manner, first using the picolinoylacetic acid ester.

Benzoylacet-furoylacet-1,5-diamino naphthalene which decomposes above 245° C. may be prepared after the manner of Procedure A by substituting a similar amount of 1,5-diamino-naphthalene for the benzidine.

Various other specific compounds which fall under the generic formula can be prepared in a similar manner by reacting any acylacetic acid ester having the above characteristics with any diamine having the above characteristics, to form a monoamide, and then reacting the monoamide with another acyl-acetic ester in a manner similar to the above procedure.

The above-described class of color-formers, many of which are new compounds, may be incorporated in developer solutions containing aromatic amino developing agents which will couple under conditions of development with the color formers to form a dye. They may also be incorporated in photographic emulsions, especially emulsion layers in multi-layer film used for color photography. In some cases the use of dispersing agents such as alkylated naphthalene sulfonates, higher aliphatic alcohol sulfates, higher aliphatic sulfonates, mineral oil sulfonates, Turkey red oil, etc. may be resorted to. The novel color-formers may be used in conjunction with the usual sensitizing dyes which are used in silver halide emulsions to render them sensitive to certain wave lengths of light.

The invention will be further illustrated but is not intended to be limited by the following examples:

Example I

To 100 ccs. of 2% by weight aqueous gelatin solution is added a solution consisting of 8 ccs. of ethyl alcohol containing NaOH and 1 gram of the compound having the formula:

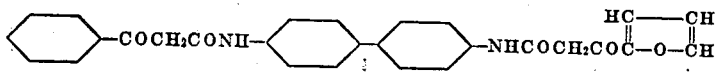

The total weight of the combined solution is then brought to about 150 grams with water and then the mixture is added to 100 grams of a gelatino-silver halide emulsion and mixed thoroughly. The resulting emulsion may then be coated upon a suitable support such as paper, glass or a cellulose derivative base, or upon another photographic emulsion layer which may or may not be another color-forming dye component. After exposure directly in a camera or by printing through appropriate color records, the film is developed in a non-color-forming developer. The reversed image is then developed by means of an alkaline solution of diethyl-p-phenylenediamine, whereupon a light yellow dye of good strength and color forms in situ with metallic silver.

Example II

To 100 ccs. of 2% by weight aqueous gelatin solution is added a solution consisting of 8 ccs. of ethyl alcohol containing NaOH and 1 gram of the compound having the formula:

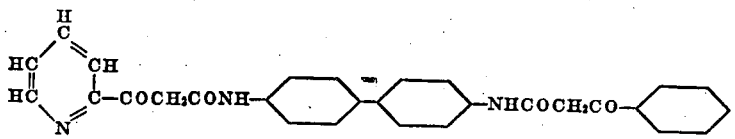

The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure, the photographic element is developed in an alkaline solution containing diethyl-p-phenylene diamine whereupon a yellow dye of good tinctorial strength is formed.

Example III

To 100 ccs. of 2% by weight aqueous gelatin solution is added a solution consisting of 8 ccs. of ethyl alcohol containing NaOH and 1.5 grams of the compound having the formula:

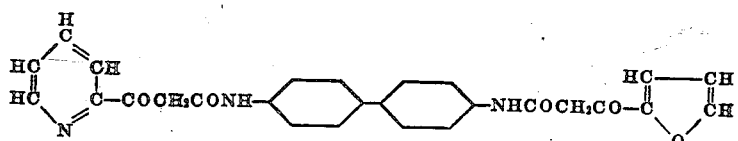

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure the photographic element is developed in an alkaline solution containing dimethyl-p-phenylene diamine, whereupon a yellow dye light in color and of good tinctorial strength is formed.

EXAMPLE IV

To 100 ccs. of 2% by weight aqueous gelatin solution consisting of 8 ccs. of ethyl alcohol containing NaOH and 1.5 grams of the compound having the formula:

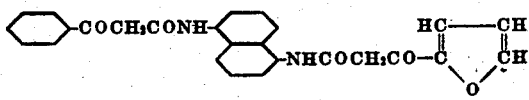

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure the photographic element is developed in an alkaline solution containing dimethyl-p-phenylene diamine, whereupon a yellow dye light in color and of good tinctorial strength is formed.

EXAMPLE V

To 100 ccs. of a developer having the following composition:

Diethyl-p-phenylenediamine hydrochloride g.... 2
Sodium sulfite (anhydrous) ............g.... 5
Sodium carbonate (anhydrous) .........g.... 20
Water ..................................cc... 1000 are added from 0.1 to 1.0 gram of picolonylacet-benzoyl-acetbenzidine dissolved in a few ccs. of ethyl alcohol. An exposed photographic element containing exposed silver salts is then developed in afore-described solution.

In place of the specific color formers specified in the examples may be substituted any of the compounds disclosed herein or falling within the generic formula. Thus, unsymmetrical diacyl-acet-diaminoarylides prepared from the above-described acyl acetic esters and cyano acyl acetic esters, and practically any aromatic polyamine containing at least one free hydrogen atom attached to each of two nitrogen atoms. Additional suitable amines include dichlorobenzidine, benzidene, dicarboxylic acids, benzidine sulfonic acids, benzidine sulfone, tolidine, tolidine sulfone, dianisidine, diphenetidine, 3,3'-di(beta-hydroxy-ethoxy) - benzidine, 4,4' - diamino-diphenylene-3,3'-diglycollic acid, 3,3'-dihydroxy-benzidine, diamino-stilbene, diamino-stilbene dicarboxylic acids, diaminodiphenylmethane, diaminodiphen-ylether, diaminodiphenylsulfide, diaminodiphen-ylamine, diaminodiphenyl methane sulfonic acids.

The dye intermediates used in this invention are not limited in their utility to any one process of color photography. They are suitable for dye coupling development with p-phenylene-diamine derivatives, and by suitably controlling the molecular weights of the products, they may be used in the color developer or in the photographic emulsion. Furthermore, the dye components of this invention couple with diazo compounds, so that they are therefore suitable for transforming into azo dyes, followed or not by differential bleaching in the presence of silver images as is known in the art.

The development process used in carrying out this invention may be applied either to a latent image in an emulsion of a silver halide which has been exposed to light and which may or may not contain the novel color formers hereof. The exposures having been made in a camera or by printing through a photographic negative image. Or it may be applied to the residual unaltered silver salt left where an initial reduced silver image has been dissolved away as in a reversal process of development. Or it may be applied to a developed photographic image in metallic silver which has been fixed by the removal of unaltered silver halides by means of solvents and subsequently converted to a developable silver salt by means of known photographic bleaching agents.

For instance, a silver halide emulsion layer containing one of the herein described color-formers which has been exposed and developed to a silver image and fixed, is treated with a diazo or tetrazo salt and converted into a colored image by the process of Christensen (U. S. 1,517,049).

The preferred developing agents in the process of dye coupling development are derivatives of p-phenylenediamine and particularly the asymmetric dialkyl p-phenylenediamines, e. g., p-aminodimethylaniline, p-aminodiethylaniline, p-aminodibutylaniline, etc. Other developing agents which may be used include p-phenylenediamine itself, p-methylaminoaniline, p-ethylaminoaniline, p-aminophenol, N,N-diethyl-o-phenylene-diamine, chloro-p-phenylenediamine, 1,2,5-tolu-ylenediamine, 2-amino-5-diethylamino-toluene, N - p - aminophenylpiperidine, N-methyl-N-hydroxyethyl-p-phenylene diamine, N-butyl-N-N hydroxy-ethyl-p-phenylenediamine, $\beta$ - $\gamma$ - dihydroxypropyl - p - phenylenediamine, 2-amino-5-(N-$\beta$-hydroxy-ethyl-N-butyl) aminotoluene and its dihydrochloride, etc. These aromatic amine-developing agents may be used in the form of their salts, which may be either inorganic or organic. The salts are, in general, more stable and soluble than the free bases. As examples of suitable salts mention is made of the hydrochloride, sulfates, acetates, etc.

This application is a continuation-in-part of our prior applications, Serial No. 215,702, filed June 24, 1938, now U. S. Patent 2,184,303 and Serial No. 252,818, filed January 25, 1939, now U. S. Patent 2,283,276. The color formers claimed herein have all of the advantages set forth in the described application and additional advantages. One advantage is the fact that they are immobile and produce very satisfactory shades of color and the shades can be varied very markedly by varying the elements of the asymmetry. Nuclear substitution is known to have but little effect on shade. However, by varying the nature of the acylacet-radicals a very accurate selection of the exact shade theoretically required by the sensitivity band of the blue record layer of a multilayer film is possible. This delicate control of shade by suitable combination of the elements of asymmetry facilitates the construction of different multilayer films for true recording under different types of illumination.

A number of these color formers even though free from solubilizing groups can be satisfactorily dispersed in emulsions without the necessity of dispersing agents. Furoylacet - benzoyl - acetbenzidine is especially valuable in this connection and produces a haze-free layer.

The unsymmetrical acylacetdiamino arylides which contain a cyclic nuclei in each acylacet group represent the preferred embodiments hereof because of their shade of color.

As many apparently widely different embodiments of this invention may be made without departing from the spirit and scope thereof it is to be understood that we do not limit ourselves to the specific embodiments herein except as defined by the appended claims.

We claim:

1. A photographic developer solution containing an aromatic amino developing agent containing an unsubstituted amino group and an unsymmetrical diacylacet-diamino-arylide having a divalent hydrocarbon radical containing at least two benzene rings which is attached to the amide nitrogen atoms, wherein the acyl radicals are different and at least one of the acyl radicals contains a cyclic nucleus.

2. A photographic developer solution containing an aromatic amino developing agent containing an unsubstituted amino group and an unsymmetrical diacylacet-diamino-arylide having a divalent hydrocarbon radical containing at least two benzene rings which is attached to the amide nitrogen atoms, wherein the acyl radicals are different and at least one of the acyl radicals contains a heterocyclic nucleus.

3. A photographic developer solution containing an aromatic amino developing agent containing an unsubstituted amino group and an unsymmetrical diacylacet-benzidide of the general formula

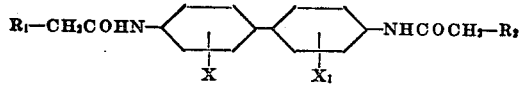

wherein $R_1$ and $R_2$ are different carboxylic acyl radicals at least one of which contains a cyclic nucleus and the X's are members of the group consisting of hydrogen, halogen, alkyl, alkoxy, hydroxy, nitro, carboxylic and sulfonic groups.

4. The process which comprises developing a photographic silver salt image with an aromatic amino compound developing agent containing an unsubstituted amino group in the presence of a compound of an unsymmetrical diacylacet-diamino-arylide having a divalent hydrocarbon radical containing at least two benzene rings which is attached to the amide nitrogen atoms, wherein the acyl radicals are different and at least one of the acyl radicals contains a cyclic nucleus.

5. The process which comprises developing a photographic element containing images in light sensitive silver salts with an aromatic amino developing agent containing an unsubstituted amino group in the presence of N-acetoacet-N'-furoylacet-benzidine.

6. A photographic element having at least one emulsion layer containing a light sensitive silver salt and N-acetoacet-N'-furoylacet-benzidine.

EDMUND B. MIDDLETON.
ANDREW B. JENNINGS.